United States Patent [19]

Stauffer

[11] 3,776,639
[45] Dec. 4, 1973

[54] FREQUENCY RESPONSIVE FOCUS DETECTING APPARATUS

[75] Inventor: Norman L. Stauffer, Englewood, Colo.

[73] Assignee: Honeywell, Inc., Minneapolis, Minn.

[22] Filed: June 5, 1972

[21] Appl. No.: 259,787

[52] U.S. Cl. ............... 356/126, 250/201, 250/235, 356/125
[51] Int. Cl. ............................................ G01b 9/00
[58] Field of Search .................. 250/201, 235, 204; 356/122, 125, 126; 350/7

[56] References Cited
UNITED STATES PATENTS

| | | | |
|---|---|---|---|
| 3,450,883 | 6/1969 | Thomas | 250/204 |
| 3,599,552 | 8/1971 | Harvey | 250/201 |
| 3,418,477 | 12/1968 | Knutrud et al. | 250/201 |
| 3,651,256 | 3/1972 | Sherman et al. | 350/7 |
| 2,831,057 | 4/1958 | Orthuber | 250/204 |
| 2,838,600 | 6/1958 | Salinger | 250/201 |

Primary Examiner—Ronald L. Wibert
Assistant Examiner—V. P. McGraw
Attorney—Arthur H. Swanson et al.

[57] ABSTRACT

A lens device traverses a predetermined portion of a light path between an external scene and an image plane on which an image of the scene is to be focused. A wobbulating mirror effects a rotation of the image on the image plane. A light detection device comprising a mask with apertures therein and a light responsive device, is positioned at the image plane. As the image is uniformly moved over the mask, the frequency characteristic of the output signal of the light detection device varies with the degree of sharpness of the scanned image. The high pass filter passes only the high frequency components of the output signal of the light detection device to a frequency-to-magnitude converter which, in turn, is connected to a peak detector circuit. The output of the peak detector circuit is related in time to the position of the lens at which the best focused image appeared at the image plane during the predetermined travel of the lens.

8 Claims, 1 Drawing Figure

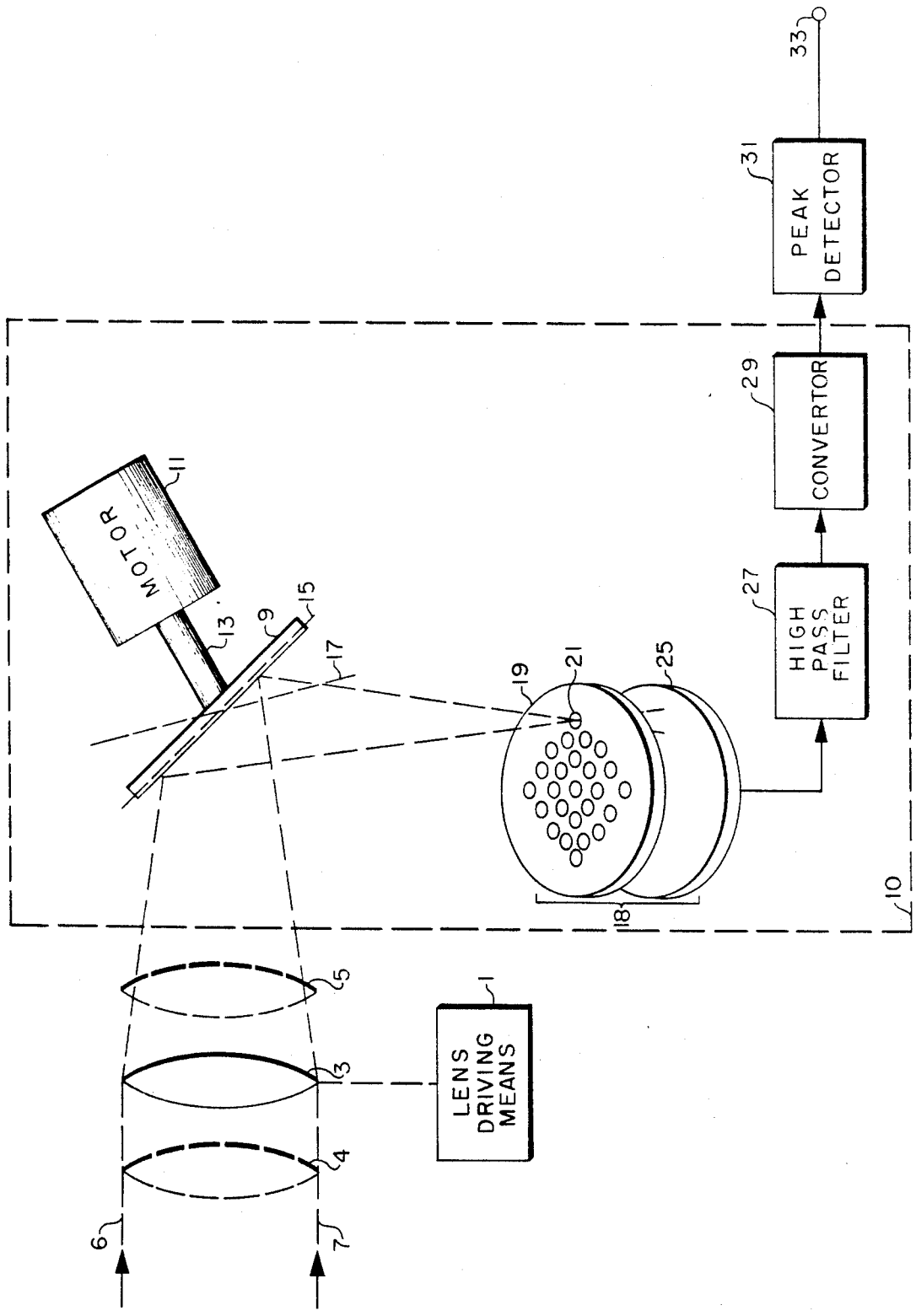

FREQUENCY RESPONSIVE FOCUS DETECTING APPARATUS

The present invention relates generally to optical focusing, and more particularly the automatic focusing of a lens system.

In most automatic focusing systems, two basic motions are present. One is the motion of a focusing lens with respect to a plane on which a focused image of a scene is to be formed. The second motion is a scanning motion of a light detector with respect to the image at the image plane. As the lens moves from one extremity to another in a predetermined path of travel, a point will be passed at which a major portion of a scene being projected upon the image plane will be in focus. The focused portion of the projected image is characterized by abrupt contrast changes as compared with the gradual or diffused contrast changes of an unfocused image. If the image is continually scanned during the lens movement, the image contrast changes may be detected.

In the past, the scanning motion of most scanning systems has been sinusoidal in nature, i.e., the scanning speed-time curve has been sinusoidal. Therefore, during the "back and forth" movement of a scanning means, its speed is not uniform, i.e., the speed of the scanning detector is less at the extremities of the scan than it is during the middle portion of the scan. Consequently, the scanning detector would generate a data signal having one spacial frequency characteristic if a sharply defined contrast change were scanned in the middle portion of the scan; but if the same sharply defined contrast change were encountered near one extremity of a scan, a different data signal, having a different spacial frequency characteristic, would be generated. In effect, the spacial frequency of the data signal will have been modulated by the non-uniform scanning rate. Therefore, prior art devices using such sinusoidal scanning motions, have had the disadvantage that inaccurate changes in contrast of a scanned image were produced.

A disadvantage of another type of device, is apparent in devices using more than one light sensor for detecting changes in contrast; with the passage of time, any two light sensors may give different responses for the same amount of light received. That uncontrolled variable leads to the further disadvantage of increasingly inaccurate focus detection, with the passage of time.

In some prior art systems, the image is scanned through a straight line path, in a "back and forth" motion across an image. In those systems, a further disadvantage appears when an image of a scene, which is oriented along the same direction as the scanning path, is to be focused. For example, focusing a projection of a dark vertical line on a light background, if the scanning motion is also vertical, no significant contrast changes will be detected. Therefore, no "in focus" signal will be generated even when the image of the line has actually been focused on the image plane.

It is, accordingly, an object of the present invention to provide an automatic focusing system which obviates the disadvantages of prior art apparatus.

It is another object of the present invention to provide an automatic focusing system having a uniform scanning rate.

It is yet another object of the present invention to provide an automatic focusing system as set forth, the accuracy of which is not substantially attentuated with time.

It is a further object of the present invention to provide an automatic focusing system as set forth which is substantially insensitive to relative image position and alignment with respect to a scanning motion.

In accomplishing these and other objects, there has been provided, in accordance with the present invention, an improved automatic focusing system having a novel image scanning means which effects the uniform scanning of a projected image whereby to prevent the generation of spacial frequency modulation.

A better understanding of the present invention may be had from the following detailed description, when read in connection with the accompanying drawing, in which the single FIGURE is a schematic diagram of an embodiment of the present invention.

Referring to the drawing in detail, a lens driving means 1 effects the movement of a lens 3 between two extreme positions, 4 and 5. The lens 3 may be part of a more sophisticated lens system, although, for the sake of simplicity, only the single lens 3 is shown in the present embodiment. Radiations, represented by the rays or lines 6 and 7, emanating from a single point source of a distant scene or object pass through the lens means, represented by the lens 3, to a rotating mirror 9. The mirror 9 is driven in a wobbulatory manner by a motor or other driving means 11 through a shaft 13. The driving means 11, shaft 13, and mirror 9 comprise a deflection means for deflecting the radiations 6 and 7 in a predetermined manner as hereinafter explained. The wobbulation of the mirror 9 is caused by its non-perpendicular or angularly offset alignment with respect to the axis of the motor shaft 13. As the mirror 9 rotates, its reflective angle with respect to the incident radiation will traverse, between planes 15 and 17, the latter being shown in phantom. While the mirror 9 moves between planes 15 and 17 as it is rotated by the motor shaft 13, the radiations 6 and 7 are reflected toward a detection means 18 comprising a mask 19 and a light responsive device 25. As the mirror 9 wobbulates, the radiation from the scene being viewed traverses the mask 19 in a circular pattern. The uniform circular scanning of the radiations 7 may also be accomplished by other deflection means, such as a rotating off-center focus lens or a rotating prism in front of or combined with the lens 3. The mask 19 in the present example has a plurality of apertures 21 therein, which apertures may be arranged in a random pattern. Light passing through the apertures 21 will fall on the light responsive device 25. The mask 19 and the light responsive device 25, which together comprise the detection means 18, detect the contrast definition of an image formed at the plane of the mask 19 as is hereinafter explained. The mask 19 and the light responsive device 25 are shown separately in the drawing, although they may be advantageously joined together as one member to accomplish the same result. The light responsive device 25 is connected to the high pass filter 27, which is, in turn, connected, through a frequency to magnitude converter 29, to a peak detector 31.

The operational goal of the exemplary embodiment of the present invention is to accurately determine the position of the lens 3 at which an image of a scene being viewed through the lens 3 is presented in sharpest contrast on an image plane, which, in the present example, is the surface of the detection means 18, or more precisely, the surface of the mask member 19 of the detection means 18. Any scene may be said to be comprised of a number of point sources of light, each point source of the scene emitting rays of light in all directions. Referring to the FIGURE, two rays of light, 6 and 7 coming from a single distant point source of a scene being viewed, pass through the lens 3. As the two rays from the single point source pass through the lens 3, they are refracted toward each other and begin to converge. Where those two rays converge, which is desirably at the image plane or surface of the mask 19 in the present example, an image of that point source is formed. Using the same approach, it is apparent that when the lens 3 is in a proper focus position, all of the light rays emanating from the individual point sources of a scene lying substantially in the same relative plane with respect to the plane of the lens 3, will be clearly defined at the image plane, at the points of their respective convergence; and therefore, an "in focus" image of that scene will be formed on the plane of the mask 19 in the present example. That "in focus" image will be characterized by clearly defined contrast changes, as compared with the gradual or diffused contrast changes of an unfocused image. In the present embodiment, the wobbulating mirror 9 rotates at a much faster rate than the rate of traversal of the lens 3 from the position 4 to the position 5. The mirror 9 effects the uniform circular scanning of an image formed at the mask 19 over the apertures 21 therein. If the lens 3 is not in a proper focus position, the image formed at the mask 19 will not be in focus. As that unfocused image traverses the apertures 21 in the mask 19, only relatively gradual light changes will be detected by the light responsive device 25; and therefore, the data signal generated by the light detection means 18 will rise and and fall gradually. On the other hand, when the lens 3 is in a proper focus position, the image formed at the mask 19 will be in focus and exhibit sharply defined contrast changes. As the image is uniformly moved across the apertures 21 in the mask 19, those sharply defined contrast changes will effect abrupt changes in the data signal generated by the detection means 18, as the edges of the apertures 21 of the mask 19 are traversed. Those abrupt changes in the data signal are evidenced by an increase in the high frequency components thereof. The high pass filter 27 passes only those high frequency components above a predetermined value; the frequency-to-magnitude converter 29 converts the filtered data signal into a signal which varies in magnitude with the amplitude and value of the high frequency components present in the frequency distribution of the data signal. Therefore, the frequency-to-magnitude converter 29 provides a signal which varies in magnitude with the definition of the contrast changes of the image appearing on the image plane, or in the present example, the mask 19. The peak detector circuit 31 provides a control signal at its output terminal 33 which is representative of the peak value of the converter output signal generated during the movement of the lens 3 from position 4 to position 5. That control signal is related in time to the position of the lens 3 at which the sharpest image was formed at the scanning mask 19, i.e., the time required for the lens to move to its best focus position is the same time as that required for the control signal to attain its peak value. The control signal may be applied to the lens driving means 1. The lens driving means 1 may include coordinating circuitry to effect the termination of the movement of the lens 3 at the "in focus" position of the lens 3.

Thus, there has been provided, in accordance with the present invention, an improved focus detection system, including a novel scanning system, which uniformly scans an image to be focused and provides a signal representative of the attainment of a focused image.

The embodiments of the invention in which an exclusive property or privilege is claimed are defined as follows:

1. In an apparatus wherein a relative movement between a lens means and an image plane is established for determining the relative position of said lens means with respect to said image plane at which an image, formed at said image plane, by radiations passing through said lens means from an external source, is in sharpest contrast, the combination comprising:
   scanning means for effecting a relative scanning between said image and said image plane at a constant rate;
   detection means at said image plane, said detection means being responsive to the contrast definition of said image for providing a data signal having a frequency characteristic which varies in accordance with said contrast definition of said image; and
   signal responsive means connected to said detection means, said signal responsive means being responsive to said data signal for providing a control signal representative of the maximum value of said data signal frequency characteristic attained during said relative movement between said lens means and said image plane, said maximum value of said data signal frequency characteristic being related to the relative position of said lens means with respect to said image plane at which said image at said image plane is in sharpest contrast.

2. The combination as set forth in claim 1 wherein said scanning means includes deflection means for effecting a circular relative scanning between said image and said detection means.

3. The combination as set forth in claim 2 wherein said deflection means includes a reflective member for reflecting said radiations passing through said lens means, toward said detection means.

4. The combination as set forth in claim 3 wherein said deflection means further includes means for wobbulating said reflective member about a rotational axis for effecting a scanning of said image over said detection means at said constant rate.

5. The combination as set forth in claim 1 wherein said detection means further includes:
   masking means at said image plane, said masking means having at least one aperture therein for selectively passing radiations from said lens means therethrough; and
   light responsive means responsive to said selectively passed radiations for providing said data signal.

6. The combination as set forth in claim 5 wherein said data signal characteristic is the frequency distribution of said data signal, and said signal responsive means further includes a filter means for passing only components of said data signal above a predetermined frequency.

7. The combination as set forth in claim 6 wherein said signal responsive means further includes:

a frequency-to-magnitude converter means connected to said filter means for providing a conversion signal varying in magnitude with the amplitudes of said frequency components; and a peak detector circuit connected to said frequency-to-magnitude converter means for providing said control signal.

8. In an apparatus wherein an image is formed at an image plane by radiations from an external scene, the combination comprising:

a lens means positioned between said external scene and said image plane for passing said radiations therethrough;

driving means for driving said lens means between predetermined positions between said scene and said image plane;

scanning means for effecting a relative scanning between said image and said image plane at a constant rate;

detection means at said image plane, said detection means being responsive to the contrast definition of said image for providing a data signal having a frequency characteristic which varies in accordance with said contrast definition of said image; and signal responsive means connected to said detection means, said signal responsive means being responsive to said data signal for providing a control signal representative of the maximum value of said data signal frequency characteristic attained during said relative movement between said lens means and said image plane, said maximum value of said data signal frequency characteristic being related to the relative position of said lens means with respect to said image plane at which said image at said image plane is in sharpest focus.

* * * * *